United States Patent
Prettejohn et al.

(10) Patent No.: US 12,204,542 B2
(45) Date of Patent: *Jan. 21, 2025

(54) PERFORMING DATABASE JOINS IN DISTRIBUTED DATA PROCESSING SYSTEMS

(71) Applicant: Palantir Technologies Inc., Denver, CO (US)

(72) Inventors: Nicolas Prettejohn, Bath (GB); Katherine Ketsdever, Atherton, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,723

(22) Filed: May 12, 2023

(65) Prior Publication Data

US 2023/0359623 A1 Nov. 9, 2023

Related U.S. Application Data (63) Continuation of application No. 17/557,883, filed on Dec. 21, 2021, now Pat. No. 11,687,532.

(30) Foreign Application Priority Data

Dec. 23, 2020 (GB) ..................................... 2020496

(51) Int. Cl.
*G06F 15/16* (2006.01)
*G06F 16/22* (2019.01)
(Continued)

(52) U.S. Cl.
CPC .... *G06F 16/24544* (2019.01); *G06F 16/2282* (2019.01); *G06F 16/24532* (2019.01); *G06F 16/2456* (2019.01)

(58) Field of Classification Search
None
See application file for complete search history.

(56) References Cited

U.S. PATENT DOCUMENTS 9,235,611 B1 * 1/2016 Murray ................ G06F 16/278
11,687,532 B2 6/2023 Prettejohn et al.
(Continued)

FOREIGN PATENT DOCUMENTS

EP 4 020 250 6/2022

OTHER PUBLICATIONS

Official Communication for European Patent Application No. 21216362.0 dated May 13, 2022, 10 pages.
(Continued)

*Primary Examiner* — Alex Gofman
(74) *Attorney, Agent, or Firm* — Knobbe, Martens, Olson & Bear, LLP (57) ABSTRACT

A computer-implemented method for efficiently performing a database join in a distributed data processing system comprising multiple computational nodes, the method comprising determining a first set of one or more columns of a first database table and a second set of one or more columns of a second database table on which the join is to be performed; estimating a size of the rows of the first table which have a particular combination of values in the first set of columns; computing a salt factor n based on the estimated size of rows and further based on a processing capacity of a computational node of the distributed data processing system; assigning one of n different salt values to each row of the first table having the particular combination of values in the first set of columns; for each row of the second table having the particular combination of values in the second set of columns into n rows, expanding the row into n row, and assigning to each expanded row a different one of the n salt (Continued)

values; and performing a join operation on the modified first and second tables, wherein the rows of the first and second tables have the same combination of values in the first and second sets of columns and the same salt value are joined on the same computational node.

13 Claims, 5 Drawing Sheets

(51) Int. Cl.
*G06F 16/2453* (2019.01)
*G06F 16/2455* (2019.01)

(56) References Cited

U.S. PATENT DOCUMENTS

| | | |
|---|---|---|
| 2007/0276788 A1 | 11/2007 | Cohen |
| 2009/0106008 A1 | 4/2009 | Branson et al. |
| 2013/0046922 A1* | 2/2013 | Pan ............... G06F 16/90339 |
| | | 711/104 |
| 2017/0006129 A1 | 1/2017 | Raja et al. |

OTHER PUBLICATIONS

Official Communication for European Patent Application No. 21216362.0 dated Jan. 3, 2024, 7 pages.

* cited by examiner

PERFORMING DATABASE JOINS IN DISTRIBUTED DATA PROCESSING SYSTEMS

INCORPORATION BY REFERENCE TO ANY PRIORITY APPLICATIONS

This application is a continuation of U.S. patent application Ser. No. 17/557,883, filed Dec. 21, 2021, and titled "PERFORMING DATABASE JOINS IN DISTRIBUTED DATA PROCESSING SYSTEMS," each of which is hereby incorporated by reference herein in its entirety. Any and all applications for which a foreign or domestic priority claim is identified in the Application Data Sheet as filed with the present application are hereby incorporated by reference under 37 CFR 1.57.

TECHNICAL FIELD

The present disclosure pertains to distributed data processing systems, and more particularly, to performing database joins in distributed data processing systems for processing relational data.

BACKGROUND

Relational data stores store items of data across a plurality of tables, in a manner that is capable of efficiently encoding relationships between them. In particular, relational data stores can encode relationships between data items through the use of rows, columns, and relationships between columns in different tables. In many situations, relational data stores provide computational benefits by enabling data transformations which leverage these relationships to be rigorously defined and efficiently performed. One such data transformation is a database join, which combines two tables into a joined table according to a relationship between certain columns of the two tables to be combined. More particularly, a database join may specify one or more particular columns of the first table and one or more corresponding columns of the second table, such that a row of a first table is to be joined to a row of a second table and the joined row provided in the joined table, if the values of the one or more particular columns in the row of the first table match the values in the one or more corresponding columns in the row in the second table. The combination of the one or more particular columns of the first table, which is to match the combination of the one or more corresponding columns of the second table, is called the join key.

As the scale at which data is collected increases, so does the cost of storing and processing it. The quantity of data handled by today's typical data users is so large that storing it in relational data stores and making use of relational data transformations such as database joins is extremely computationally intensive, to the point that such transformations can no longer be performed in a reasonable time on a single computing device.

This has prompted the development of distributed data processing systems for processing relational data, such as Apache Spark, which process relational data in parallel over clusters of computational nodes.

SUMMARY

Aspects of the innovations are recited in the appended claims.

DETAILED DESCRIPTION

The detailed description set forth below is intended as a description of various configurations of the subject innovations and is not intended to represent the only configurations in which the subject innovations may be practiced. The appended drawings are incorporated herein and constitute a part of the detailed description. The detailed description includes specific details for the purpose of providing a thorough understanding of the subject innovations. However, the subject innovations are not limited to the specific details set forth herein and may be practiced without these specific details. In some instances, some structures and components are shown in block diagram form in order to avoid obscuring the concepts of the subject innovations.

Overview

Distributed data processing systems such as Apache Spark are capable of performing database joins on large tables in parallel over a plurality of computational nodes, also known as 'executors'. This may be achieved by adopting a 'divide-and-conquer' strategy, wherein a first table to be joined is decomposed into one or more groups of rows, such that all the rows of the first table having the same value of join key belong to the same group. The second table may similarly be decomposed into groups of rows. To perform the join, each group of rows of the first table may then be separately joined with a corresponding group of rows of the second table corresponding to the same value(s) of the join key, instead of processing the entire first and second tables at once. Each separate join is performed on a single executor, enabling the executors to work in parallel. The results obtained by the executors may then be concatenated to yield the joined table.

A requirement of such a 'divide-and-conquer' approach is that all the rows in the first table and the second table having a same value of the join key must be processed in a single job on an executor. However, the size of those rows may be too large to be efficiently processed on an executor. For example, if their size exceeds an amount of memory available on the executor, or another measure of the processing capacity of the executor, the executor's throughput may be reduced. For example, the executor may need to store some of the data in slow memory such a hard disk drive, causing low throughput when the data needs to be retrieved. This problem may be further compounded if the data to be joined is skewed, that is, if a large proportion of the rows of a table have a particular value of join key. In such situations, a single executor would need to process all those rows in a single job, which may take orders of magnitude longer than the other executors, and finishing long after the other executors. This may be a poor use of the computational resources of the distributed data processing system, since the resources of the other executors would typically be held up while waiting for the last one to complete.

Such issues may be alleviated by a technique called 'salting'. Salting involves associating, to each row of one of the tables to be joined, one of a plurality of distinct tokens called 'salt values', and expanding each row of the other table into a plurality of rows, one for each distinct salt value and each associated with a distinct salt value. The salt values are assigned uniformly over the rows of the first table. The join is then performed on the modified tables, where a row of the modified second table is joined with a row of the modified first table if the join keys of both rows match and the associated salt values match. For example, the salt value associated to each row may be stored in an additional column in the first table and in the second table, and the columns included in the join key. The result of joining the two modified tables is identical to the result of joining the two original tables. However, the salting operation may provide computational benefits, since the size of the rows of the first table which need to be processed at once on an executor—those which have a same value of both join key and salt value—may be divided by the number of distinct salt values, which is denoted the 'salt factor'. In this manner, the size of the data which an executor must process in a single job may be reduced to a point where every executor is able to efficiently process each job. However, the salting operation also expands the second table by the salt factor, leading to an increase in the total amount of data which must processed in order to perform the join.

Should salting be performed manually, trial-and-error would be needed in order to determine an acceptable salt factor. As such, at least one run with reduced performance might be expected before salting could be implemented effectively.

The present innovations provide for calculating the salt factors for each value of the join key and performing the salting process automatically before each join, thus ensuring that every run of the database join makes good use of the computational resources of the distributed data processing system. Moreover, the calculation may be performed just-in-time, that is, between receiving the instruction to perform a join and performing the salting process, and therefore automatically adapt as new data is added to the tables and as the hardware and software of the executors evolve.

The benefits of salting can be retained while expanding the second table by a lesser extent, by salting different groups of rows with different salt factors. Indeed, it is usually the case that only some values of join keys correspond to groups of rows too large for a single executor. In this light, the present innovations provide for assigning salt values to the rows corresponding to a particular join key. The rows corresponding to different join keys may be salted independently and using different salt factors. In this manner, it may be ensured that none of the jobs sent to executors exceed their processing capacity, while minimising the increase in data caused by salting. In this way, the time needed for the join operation to complete can be reduced.

The present innovations also provide for calculating a salt factor for each value which the join key can take, based on an estimated size of the rows which have that value of the join key, and further based on a processing capacity of an executor. In this manner, the salt factor for each value of the join key can be optimally calculated so as to remove the risk of an executor running out of memory, while minimising the data bloat caused by salting.

System

Figure 1:
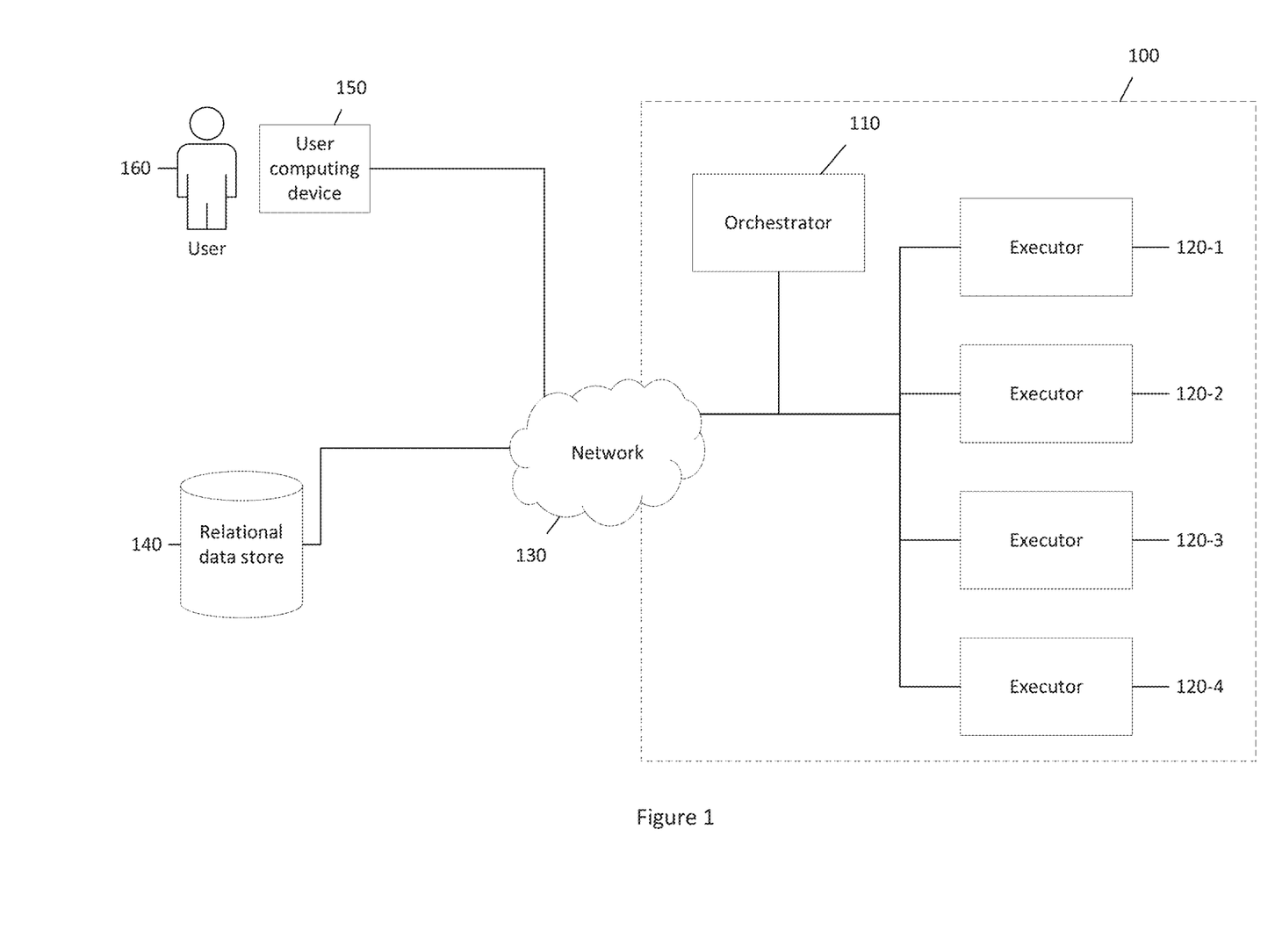
FIG. 1 represents an example distributed data processing system for processing relational data.

FIG. 1 illustrates an example distributed data processing system 100 for processing relational data. As shown, distributed data processing system 100 comprises an orchestrator 110 and a plurality of executors 120. Orchestrator 110 and executors 120 are configured to communicate with one another via a network 130. The network 130 may include the Internet, an intranet, a local area network, a wide area network, a wired network, a wireless network, and a virtual private network (VPN). In addition, the orchestrator 110 and the executors 120 of distributed data processing system 100 are configured to communicate via network 130 with a relational data store 140 and with a user computing device 150 used by a human user 160. For ease of understanding, various components of the system have each been described with reference to one or more computing devices. It should be noted that, in same embodiments, any number of these components may be co-located on the same computing device. For example, the relational data store 140 may be co-located with the orchestrator 110 or one or more of the executors 120.

The user computing device 150 may for instance be a laptop computer, a desktop computer, a mobile phone, a personal digital assistant (PDA), a tablet computer, a netbook, a television with one or more processors, embedded therein or coupled thereto, a physical machine or a virtual machine. The user computing device 112 may include one or more of a keyboard, a mouse, a display, and a touch screen. For example, the user computing device 150 may be composed of hardware components like those of computing device 500 described below with respect to FIG. 5. The user computing device 150 may also include a web browser or a client application configured to display, in a graphical user interface of the client computing device 150, a computer program for instructing distributed data processing system 100 to perform one or more data processing operations on relational data, including database joins. Such a computer program may allow the user to indicate the relational data (e.g., particular database tables), to which the data processing operations should be applied and the data processing operations to be applied. The graphical user interface may be a web browser window, a client application window, an operating system window, an integrated development environment window, a virtual terminal window or other computer graphical user interface window. While only one user 160 and one user computing device 150 are illustrated in FIG. 1, the subject innovations may be implemented in conjunction with one or more users 160 and one or more user computing devices 150.

The relational data store 140 is a computing device or system with functionality to store and retrieve data in a structured relational database format. In particular, the relational data store 140 is able to store and retrieve relational database tables and/or portions of database tables (such as particular rows of tables and/or particular columns of tables), as for example may be designated using SQL queries.

The relational data store 140 may comprise a combination of a data storage system and a relational database management system (RDBMS). The data storage may be one or more files held locally on a single system, one or more files held in a distributed computing system, an Amazon S3 storage system, an Apache Hadoop Distributed File System (HDFS), etc. The relational database management system is able to encode relational data into a format to be stored in the data storage, and able to decode the data stored in the data storage into relational data. For example, the relational database management system is a SQL database such as Oracle SQL, MySQL, Microsoft SQL Server, etc. In particular, the relational database management system is a distributed relational database management system such as Apache Hive. In some embodiments, the database tables stored by the relational data store is physically encoded on multiple physical storage media, for example, if they are too large to fit on a single physical storage medium.

The relational data store 140 may comprise one or more processors and one or more storage media. The relational data store may for instance comprise one or more physical computers and/or one or more virtual machines. The relational data store 140 may for example be composed of hardware components like those of computing device 500 described below with respect to FIG. 5.

Distributed data processing system 100 is capable of performing data processing operations on relational data over a plurality of computing devices. To this end, distributed data processing system 100 comprises a combination of an orchestrator 110 and of a plurality of executors 120, which perform data processing operations in parallel. For example, the distributed data processing system 100 may be an instance of an Apache Spark system. As such, distributed data processing system is capable of efficiently performing data processing operations on datasets larger than may be processed by a single executor.

The orchestrator 110 is capable of receiving instructions regarding one or more data processing operations (including database joins) to be performed on relational data, determining a strategy for implementing the one or more data processing operations over the plurality of executors 120—that is, determining, for each of one or more of the executors 120, a set of operations which, if carried out by the executors will enable the received data processing operations to be performed, and instructing the plurality of executors according to the strategy.

The orchestrator 110 is capable of receiving instructions regarding one or more data processing operations from the user computing device 150, or from any other suitable source. Such instructions may indicate both the relational data on which the data processing operations are to be performed, as well as instructions for the performance of the data processing operations. For example, a database join data processing operation may be an INNER JOIN, LEFT JOIN, RIGHT JOIN, or OUTER JOIN of two tables. In such a case, instructions regarding the data processing operation may indicate the left and right tables to be joined, and a condition according to which rows should be joined. For example, the condition may be an column equality condition that stipulates that a row of the left table is to be joined to a row of the right table if the one or more specified columns of the left table match one or more corresponding columns of the right table. In such a case, instructions regarding the data processing operation include an indication of the one or more columns of the left table and an indication of the corresponding one or more columns of the right table which are to be matched. A 'join key' denotes the combination of the one or more specified columns of the left table, which are to match the one or more corresponding columns of the right table.

The orchestrator 110 is configured to determine a strategy for implementing one or more data processing operations over a plurality of executors. In particular, the orchestrator is configured to determine a strategy for decomposing a data processing operation into multiple data processing operations, each capable of being independently carried out on a single executor 120. For example, where a data processing operation is a database join of two tables on a matching column condition, the orchestrator 110 is configured to determine a divide and conquer strategy, such as a sort-merge join strategy, for performed the join over multiple executors in parallel.

In such a divide and conquer strategy, at least one of the two tables to be joined (which we denote by 'first table') are decomposed into a plurality of groups of rows, such that all the rows of the first table having a same value of the join key are in the same group of rows. Each group of rows can then be separately joined with the second table, such that combining the results of the separate joins may yield a correct result for the original join. The separate joins are performed on different executors, enabling time gains by parallelisation.

More particularly, in a sort-merge join strategy, each table to be joined is decomposed into a plurality of groups of rows, in such a way that all the rows of the first table having a same value of the join key are in the same group of rows, and all the rows of the second table having a same value of the join key are in the same group of rows. Each group of rows of the first table can then be separately joined with the corresponding group of rows of the second table having the same value or values for the join key. In this manner, combining the results of the joins separately performed on each executor yields a correct result for the original join. Since the separate joins are performed on different executors, the overall time for completing the join is reduced compared to performing the join on a single computing device. Moreover, since each executor only needs to process a group of rows of the first table and a corresponding group of rows of the second table at any one time, compared to the entire first table and the entire second table if the join was performed on a single computing device, the data processed by an executor at a time may fit entirely in the executor's high-speed memory (e.g. RAM), significantly improving the executor's throughput.

In some cases, the strategy determined by the orchestrator 110 may entail a larger total computational workload compared to performing the data processing operation on a single computing device, but may nevertheless shorten computation time as a result of parallel processing on multiple executors and avoiding the use of slow memory. In some cases, the orchestrator may determine one strategy from among a plurality of possible strategies, which all yield the same result but may have differing computational costs (e.g. in memory usage, network usage, etc.) and different abilities to be parallelised.

The orchestrator 110 is configured to instruct a plurality of executors 120 to perform a data processing operation on particular relational data. In particular, the orchestrator is connected to the plurality of executors 120 by way of a computer network, and is able to communicate instructions to an executor 120 through a command, API, and/or network request. The orchestrator is able to communicate to an executor the data on which the executor is to perform the instructions, and/or may to indicate to the executor where to find this data in a location accessible to the executor, for example on relational data store 140.

The orchestrator 110 comprises one or more processors and one or more memory devices. The orchestrator 110 may comprise one or more physical computers and/or one or more virtual machines. The orchestrator 110 may for example be composed of hardware components like those of computing device 500 described below with respect to FIG. 5.

Each executor 120 is configured to receive instructions to perform one or more data processing operations on particular relational data, performing such operations, and providing results of the operations, to be stored in data storage and/or provided to a user for visualisation. In particular, each executor is configured to perform a database join of two tables or groups of rows, and to this end is configured to access a table and/or group of rows of a table from relational data store 140.

Each executor 120 comprises one or more processors and one or more memory devices. Each executor 120 may comprise one or more physical computers and/or one or more virtual machines. Each executor 120 may for example be composed of hardware components like those of computing device 500 described below with respect to FIG. 5. As such, the executors have a processing capacity, which measures the amount of data which the executor is capable of processing at once. Such a processing capacity may be an estimate or measure of the available high-speed memory (e.g. RAM and/or Flash memory) on the executor, since an executor's throughput may be severely reduced if it is required to perform data processing on data larger than can fit in high-speed memory, due to then needing to store some of the data in slower memory such as hard disk storage and then retrieving it at slow data rates. Such a processing capacity may additionally or alternatively reflect the computational power of the executor in terms of processor throughput. The executors 120 may all have the same hardware, thus having the same processing capacity, or alternatively some of the executors 120 may have greater computational resources than others, enabling them to process more data efficiently at once, which may be reflected in a greater processing capacity.

Finally, one or more of the orchestrator 110, the user computing device 150, and/or any other computing device connected to orchestrator 110 may be capable of modifying instructions sent to the orchestrator for performing data processing operations on relational data, for example as described below with reference to FIG. 2.

Method

Figure 2:
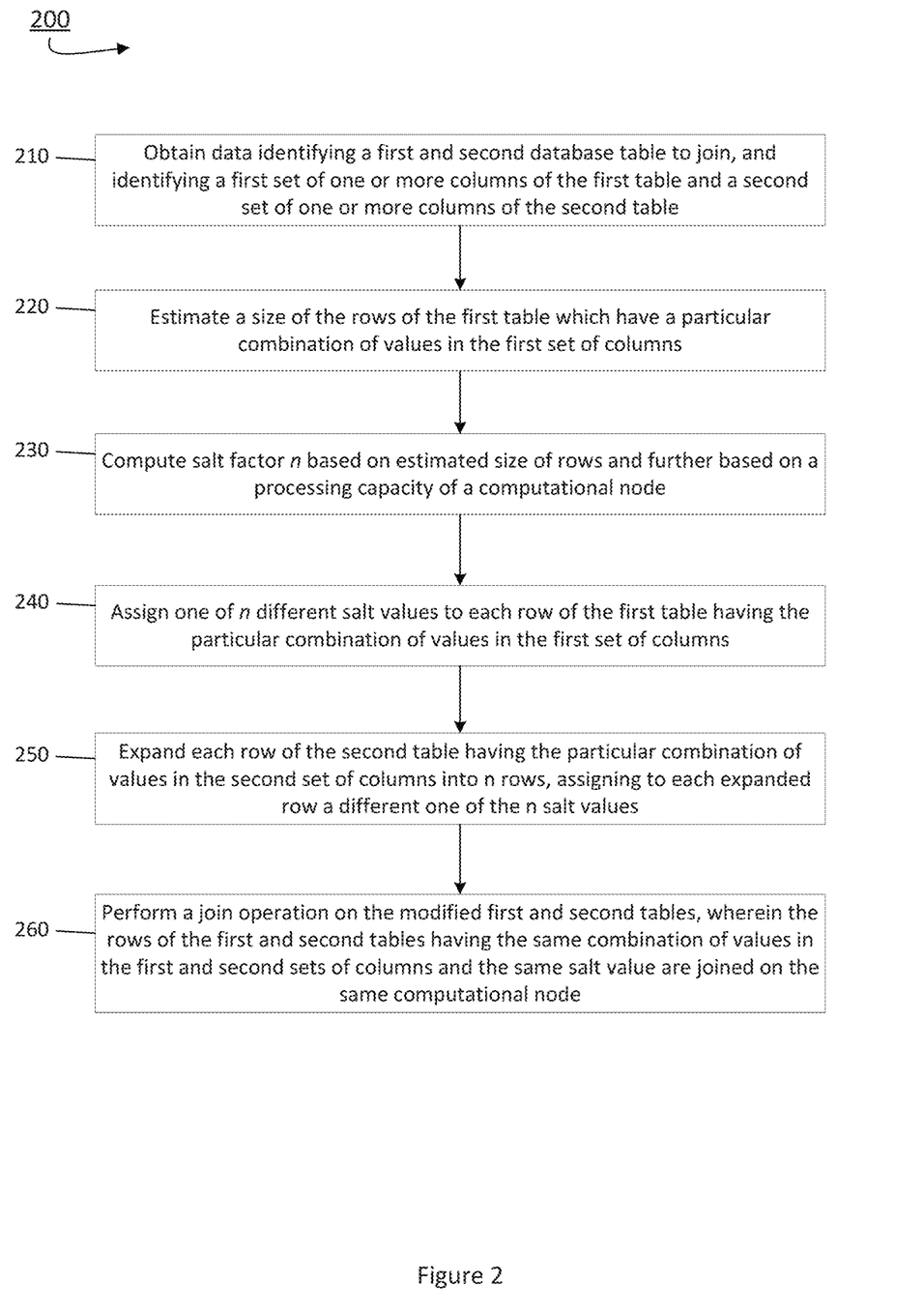
FIG. 2 shows a computer-implemented method for efficiently performing a database join in a distributed data processing system.

FIG. 2 shows a method 200 for efficiently performing a database join in a distributed data processing system comprising a plurality of computational nodes. For example, method 200 can be performed by system 100 of FIG. 1 comprising an orchestrator 110 and a plurality of executors 120, wherein the computational nodes are the executors 120. Method 200 comprises steps 210-260.

At step 210, data identifying a first database table and a second database table on which to perform a join operation is obtained, the data further identifying a first set of one or more columns of the first table and a second set of one or more columns of the second table, on which the join is to be performed.

For instance, the data obtained at step 210 may indicate that a join operation is to be performed on the first database table and the second database table such that a row of the second table is to be joined to a row in the first table if the values of the first and second sets of columns match. The values of the first and second sets of columns may be said to 'match' if, for each column of the first set of columns, the value in the corresponding column of the second set of columns is equal to the value in the column of the first set of columns. The data may specify the type of the join operation, such as one of INNER JOIN, LEFT JOIN, RIGHT JOIN, or OUTER JOIN.

Step 210 may be performed at an orchestrator 110 of a system 100 as shown in FIG. 1. Alternatively, step 210 may be performed at a computing device able to communicate with the orchestrator 110, such as at a user computing device 150, or any other computing device connected to network 130 of FIG. 1.

For example, the data identifying the first and second database table and set of columns may be provided by a human user 160 at a user computing device 150. For example, user 160 may indicate a left and right table to perform a database join on and columns of the left and right tables to be matched during the join, for instance by using a GUI to select from a list of available tables and columns.

Alternatively, the data identifying the first and second database and set of columns may be obtained from a file on an orchestrator 110, or on a computing device able to communicate with the orchestrator 110, such as a script instructing the database join to be performed.

The first and second database tables are tables available for access by an orchestrator 110 and by executors 120 of a data processing system 100. For example, the first and second database tables may be tables in a relational data store 140 accessible to the orchestrator 110 and executors 120, as shown in FIG. 1.

Figure 3:
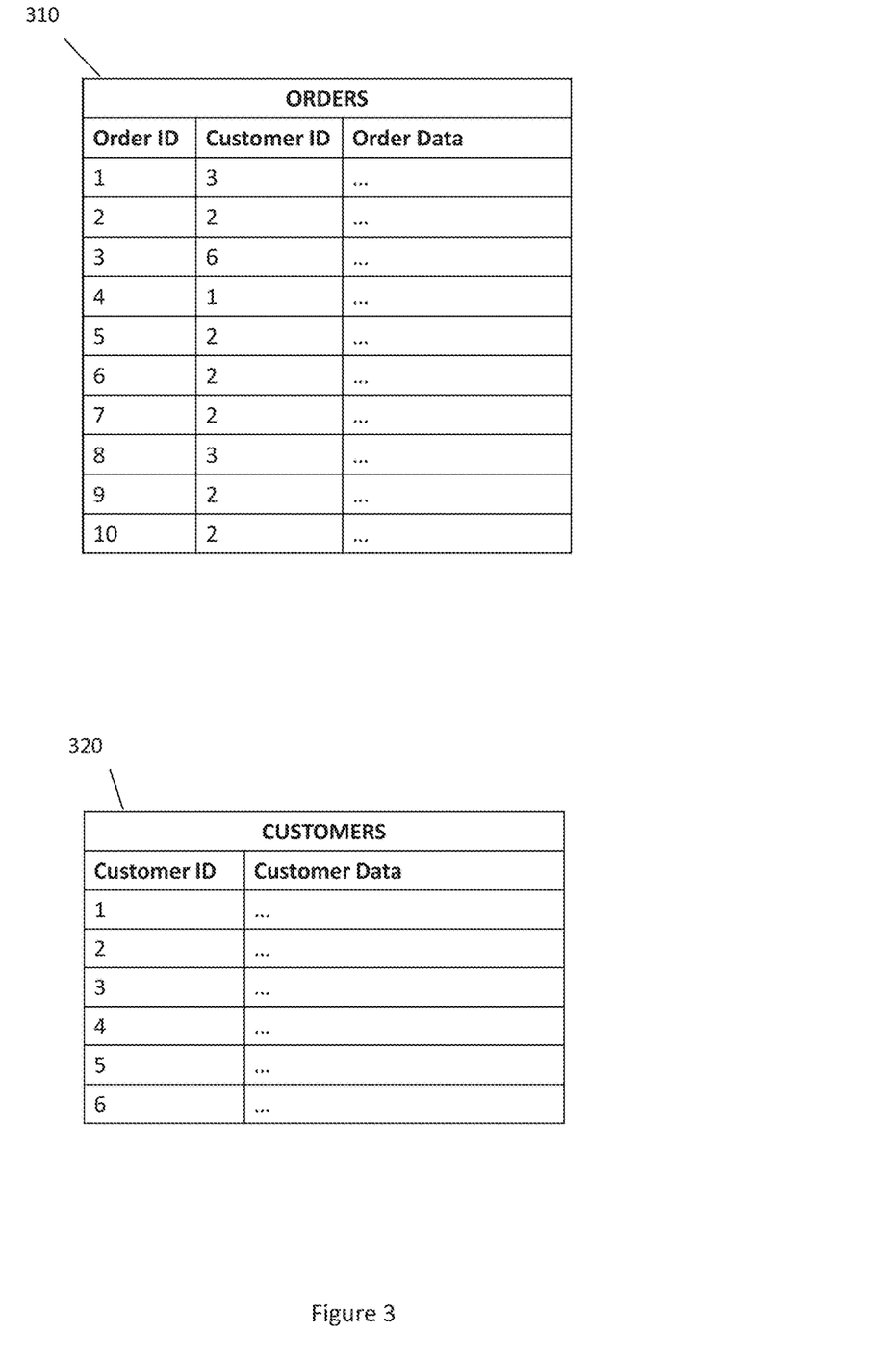
FIG. 3 shows two example tables to be joined.

As an example, the first and second database tables may be table 310 ('ORDERS') and 320 ('CUSTOMERS') of FIG. 3. In this example, table 310 is a record of orders made by customers, while table 320 stores additional information about the different customers. Table 310 thus includes an 'Order ID' column, which stores a unique identifier for each order; a 'Customer ID' column, which stores the identifier of the customer having made the order; and one or more further columns storing data related to each order (e.g., price, delivery address, etc.), denoted 'Order Data' in FIG. 3. Table 320 includes a 'Customer ID' column, which stores a unique identifier for each customer; and one or more further columns storing data related to the customer (e.g., customer billing address; when the customer account was created, etc.), denoted 'Customer Data' in FIG. 3. A user may desire to perform a database join on tables 310 and 320, by matching the 'Customer ID' column in table 310 (denoted 'ORDERS.CustomerID') with the 'Customer ID' column in table 320 (denoted 'CUSTOMERS.CustomerID'). This may for example enable the calculation of statistics such as the total revenue of orders bought by customers residing in a given geographical area. In this example, the column ORDERS.CustomerID is therefore the single column in the first set of one or more columns; the column CUSTOMERS.CustomerID is the single column in the second set of one or more columns.

It may be noted that this ORDERS table exhibits 'data skew', in that a large proportion of its rows take the same value in the Customer ID column. Indeed, there are 6 rows of the ORDERS table where the column Customer ID takes the value 2, while none of the other Customer ID values are present in more than 2 rows. For this reason, if a join was to be performed on the ORDERS and CUSTOMERS tables, all the rows of the ORDERS table having a Customer ID of 6 would need to be processed in a single job on an executor, which may take much longer than the other jobs to complete, thus causing an inefficient use of the executors' resources if the other executors were reserved while the job was being completed on the executor processing the greatest number of rows.

At step 220, a size of the rows of the first table which have a particular combination of values in the first set of one or more columns is estimated. This estimate makes it possible to estimate whether the group of rows having the particular combination of values in the first set of columns will be small enough relative to an executor's processing capacity in order to be efficiently processed on the executor.

The size of rows may be a total memory size of rows, such as a total amount of memory which may be required to store the rows having the particular combination of values in memory for processing on an executor. In particular, this may be an amount of memory required to store the rows having the particular combination of values in data objects of a programming language. This size may be estimated, for example, by summing the sizes of the rows having the particular combination of values in the first set of one or more columns. Alternatively, if the rows of the first table have a fixed data schema, such that each row takes the same amount of space in memory, the total memory size of the rows may be estimated by multiplying this amount of memory space by the number of rows having the particular combination of values. More generally, even if the amount of space taken by a row is merely an estimate, and the number of rows is also estimated (e.g., by sampling), an estimate of the total memory size may be obtained based on these two quantities. In some embodiments, the estimated size of rows may be represented in memory and/or stored as a number from which the estimated size of rows may be derived; for example, the estimated size of rows may be represented in memory by the number of rows having the particular combination of values in the first set of one or more columns.

Moreover, the size of rows of the first table which have a particular combination of values in the first set of one or more columns may be estimated for more than one particular combination of values. For example, for every different combination of values which the first set of one or more columns takes in the first table, a size of the rows having the combination of values in the first set of one or more columns may be estimated.

Step 220 may be performed at an orchestrator 110 of a system 100 as shown in FIG. 1. Alternatively, step 220 may be performed at a computing device able to communicate with the orchestrator 110, such as at a user computing device 150, or any other computing device connected to network 130 of FIG. 1.

Continuing the example of FIG. 3, since both the first set and second set of columns contain one column each, the combination of values in the first set of columns for a given row of the first table 310 is the value of the column 'ORDERS.Customer ID' in the given row. Similarly, the combination of values in the second set of columns for a given row of the second table 320 is the value of the column 'CUSTOMERS.Customer ID' in the given row. Thus, at step 220, is determined that the column ORDERS.CustomerID can take four different values −1, 2, 3 and 6, as shown in FIG. 3—and for each value, the size of the group of rows having this value may be estimated. In particular, it is determined that 6 of the rows of the ORDERS table have a Customer ID value of 2. Additionally or alternatively, it may be determined that 2 of the rows have a Customer ID value of 3; that 1 row has a Customer ID of 1; and that 1 row has a Customer ID of 6.

At step 230, based on the estimated size of rows, and further based on a processing capacity of a computational node, a salt factor n is computed for the group of rows of the first table having the particular combination of values in the first set of columns.

The processing capacity of a computational node is a measure of the quantity of data that the computational node (i.e. the executor) is capable of efficiently processing in one batch. For example, because processing a quantity of data which exceeds the quantity of high-speed memory (e.g. RAM and/or Flash memory) available to the executor may force the executor to read and write from slower storage/memory, greatly decreasing throughput, the processing capacity of a computational node may be based on a quantity of high-speed memory available to the computational node.

For example, the processing capacity may be a currently available amount of memory on a computational node, as measured in real-time using a system information utility. As another example, the processing capacity may be an average amount of available memory. Available memory is memory that is not allocated for other purposes, for instance an operating system or other applications. As yet another example, the processing capacity of a computational node may be based on the computational throughput of its processor(s). The processing capacity may be determined instead based on a combination of the above factors. The processing capacity may be expressed in any convenient units, for example as a number of bytes, kilobytes or megabytes, or a number of rows of the first table, which the computational node is capable of efficiently processing in one job. The processing capacity of the computational nodes may be obtained in any suitable way, for instance by the orchestrator 110 querying the computational nodes 120.

The computational node used to compute the salt factor n may be the computational node with the lowest processing capacity (guaranteeing efficient processing no matter the allocation of jobs to executors) or, alternatively, may be one of a plurality of higher-performance computational nodes which are assigned to perform processing on salted rows. Alternatively, the processing capacity may be a representative processing capacity of the computational nodes of the distributed data processing system.

The salt factor is used to decompose the group of rows of the first table having the particular combination of values in the first set of columns into several groups, one for each salt value. Concomitantly, the salt factor n is used to expand the group of rows of the second table having the second combination of values in the second set of columns, into n copies. As such, the salt factor enables the size of data in a group of rows to be tuned, with the size decreasing as the salt factor increases. In this manner, the amount of data which is processed by an executor at a time may be adjusted, which can be exploited by making parallel use of the executors in order to reduce processing time. However, increasing the salt factor also leads to increasing the number of copies to be processed of the group of rows of the second table having the particular combination of values in the second set of columns, causing an increase in the total amount of data which is processed across all executors.

As such, the selection of the value for the salt factor is made carefully: too low a value may lead to groups of rows which remain too large to be efficiently processed by executors even after decomposition; but too high a value may cause more work to be performed than is necessary.

The salt factor n is computed such that the estimated size of rows divided by the salt factor is less than a processing capacity of a computational node of the distributed data processing system. In particular, the salt factor n is computed such that the estimated size of the rows of the first table having the particular combination of values in the first set of columns divided by the salt factor, plus an estimated size of the rows of the second table having the particular combination of values in the second set of columns, is less than the processing capacity. In this manner, the method may ensure that the resulting groups of rows of the first table can be processed effectively by the executors.

Furthermore, the salt factor may be computed such that it is the smallest integer n such that the estimated size of rows of the first table with the particular combination of values in the first set of columns, divided by the salt factor, is less than the processing capacity. Alternatively, the salt factor may be computed such that it is the smallest integer n such that the estimated size of rows of the first table with the particular combination of values in the first set of columns, divided by the salt factor, plus an estimated size of the rows of the second table having the particular combination of values in the second set of columns, is less than the processing capacity. In this manner, the quantity of extra data to be processed by the executors, created by expanding the rows of the second table by the salt factor, is minimised, leading to improved computational efficiency.

In particular, the salt factor n may be calculated as the smallest integer greater than the ratio of the estimated size of rows of the first table with the particular combination of values in the first set of columns divided by the processing capacity. Alternatively, the salt factor n may be calculated as the smallest integer greater than the ratio of the estimated size of rows of the first table with the particular combination of values in the first set of columns divided by the difference between the processing capacity and the estimated size of the rows of the second table with the combination of values in the second set of columns.

It will be appreciated that the condition 'less than' may be replaced with 'less than or equal to' without adversely affecting the benefits provided by these features.

Moreover, it may be particularly useful to select a different salt factor for a different combination of values of the first set of columns, in order to decompose and expand to varying extents the corresponding groups of rows in the first and second table. Indeed, the size of rows of the first table having a particular combination of values in the first set of columns may vary by combination of values. As a result, the salt factor providing optimal parallel use of the executor resources will vary by combination of values. To this end, a salt factor may be calculated for each combination of values of the first set of columns that appears in the first table, and the groups of rows corresponding to each combination of values decomposed and expanded independently of one another, thus making optimal use of the data processing system resources.

For example, for a combination of values where there are a great many rows of the first table having the combination of values in the first set of one or more columns, a large salting factor may be determined for these rows. For a combination of values where there are fewer rows of the first table having the combination of values in the first set of one or more columns, a smaller salting factor may be determined for those rows. For a combination of values where there are few rows of the first table with this combination of values in the first set of the one or more columns, such that the size of these rows is smaller than the processing capacity of an executor, a salting factor of 1 may be chosen, which has no effect at all. In this manner, optimal use may be made of the resources of the data processing system.

Finally, an optimal value for the salt factor may vary over time as the database tables are updated with new data and as the executors' hardware and software evolves. As such, the computation at step 230 may be performed just-in-time before the join operation is performed, using current data for the database tables and/or the executors.

For example, continuing the example of FIG. 3, a salt factor may be computed for salting the rows of the ORDERS table having a value of 2 in the Customer ID row, based on the size of those rows and further based on a processing capacity of an executor. For example, the processing capacity of one or more of the executors may be compared to the size of the rows, and a salt factor computed to ensure that the size of the rows divided by the salt factor is less than or equal to the processing capacity. For purposes of illustration, in the present, simple example it is assumed that the processing capacity of an executor is only sufficient to process two rows of the ORDERS table at a time when performing a join. Therefore, it may be determined to salt the rows of the ORDERS table by a factor of 3, which is computed as the size of the rows having a value of 2 for Customer ID (that is, 6 rows) divided by the processing capacity of an executor (that is, 2 rows).

At step 240, the group of rows of the first table having the particular combination of values in the first set of columns is decomposed into multiple groups, each corresponding to one of n salt values. In other words, to each row of the first table having the particular combination of values in the first set of columns is assigned one of n different salt values.

To this end, n unique salt values are created, for example, the integers from 1 to n. Each row of the group of rows is then assigned one of these n unique salt values. Furthermore, the n salt values may be assigned uniformly over the rows of the group of rows. For example, they may be assigned in a round-robin fashion, assigning the salt value 1 to the first row of the group of rows, the salt value 2 to the second row, and so on, until all salt values have been assigned, and recommencing until all rows of the group of rows have had a salt value assigned to them. Alternatively, a row's salt value may be obtained as the output of a n-valued hash function of one or more fields of the row (such as the row index). For example, the salt value may be the residue of the row's index, modulo n.

A salt value may be assigned to a row of the first table in a variety of ways. For example, a column may be created in the first table for storing salt values, and the salt value for each row may be written to this column. Alternatively, the salt value may be appended to an existing column of the first set of columns. Alternatively, the salt value may be implicitly represented by other fields of the row (e.g. if it is a hash of other fields of the row).

Moreover, instead of the first table being modified in its persistently-stored form (e.g. as stored in relational data store 140), which may cause an increase in storage requirements and therefore in network usage when the table is transferred to the executors for processing, it may merely be a transient, in-memory form of the first table which is modified by assigning salt values to rows. Assigning salt values may be performed at the point of sending the first table from relational data store 140 to data processing system 100, and/or at the point of receiving the table at one or more devices of data processing system 100.

At step 250, each row of the second table having the particular combination of values in the second set of columns is expanded into n rows, and a different one of the n salt values is assigned to each of the n rows. As a result of this expansion, the join operation on the modified first and second tables, where salt values have been added to rows of the first table and rows of the second table have been expanded by a salt factor, is formally equivalent to the original join operation on the first and second tables as originally identified at step 210. Nevertheless, as a result of the modification to the first and second table, the join operation on the modified first and second tables may be more amenable to efficient parallel processing over the plurality of executors.

Each row of the second table of the second table having the particular combination of values in the second set of columns is expanded by generating n copies of it, and assigning to each copy a distinct one of the n possible salt values. As a result, denoting k the number of rows of the second table having the particular combination of values in the second set of columns, an additional k times (n−1) rows are added to the second table. Similarly to the manner in which a salt value may be assigned to a row of the first table, a salt value may be assigned to a row of the second table in a variety of ways. For example, a column may be created in the second table for storing salt values, and the salt value may be written to this column. Alternatively, the salt value may be appended to an existing column of the first set of columns.

Advantageously, only the rows of the second table having the particular combination of values for which salt values were introduced in the table are expanded at this point into multiple rows. In this manner, the increase in data to be processed when joining the modified tables, caused by this expansion, is limited only to those rows where it is strictly necessary.

Figure 4:
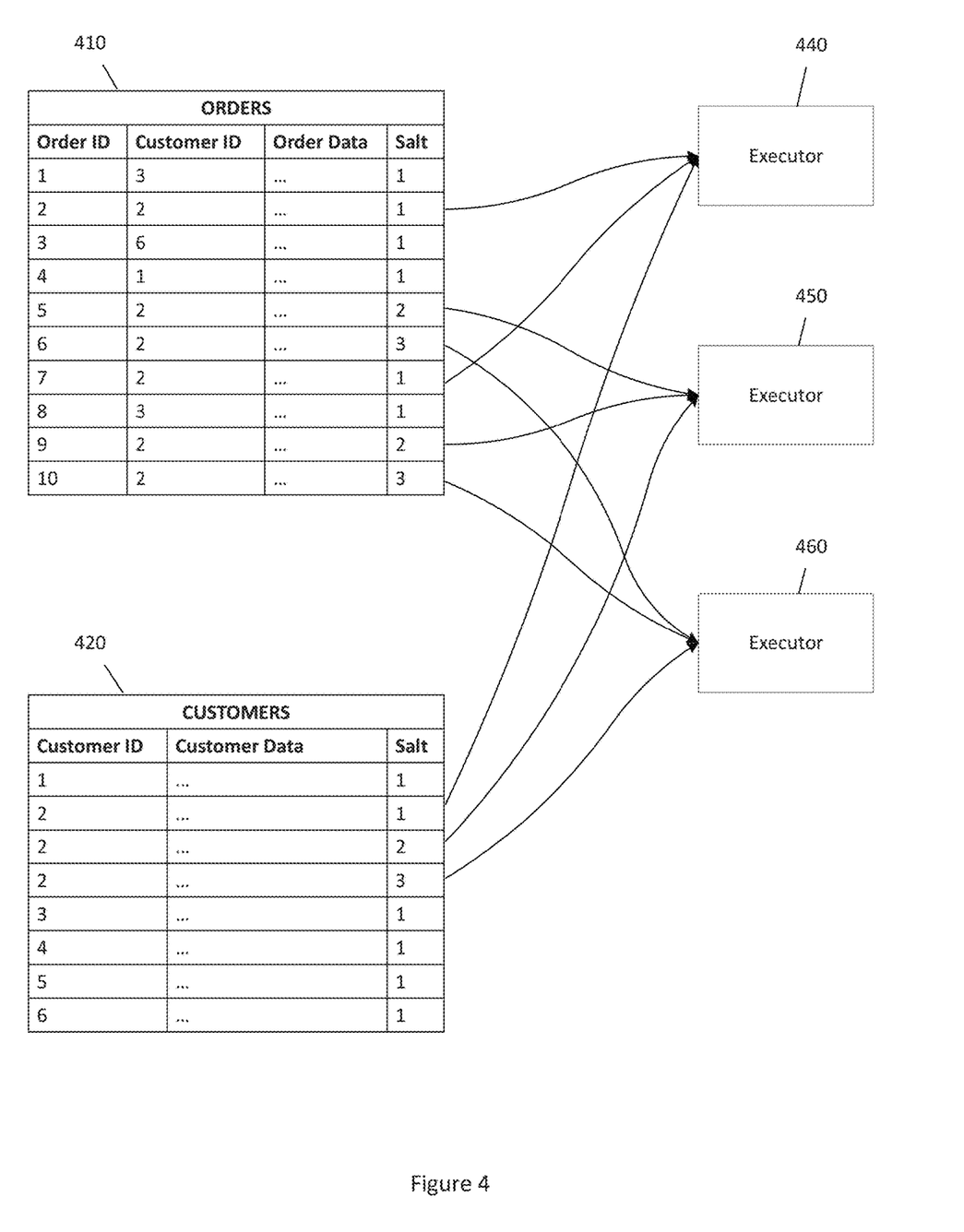
FIG. 4 illustrates the tables of FIG. 3 after a salting process.

FIG. 4 illustrates the effect of the operations of steps 240 and 250 on the tables of FIG. 3, which are transformed into modified tables 410 and 420. In particular, at step 240, the rows of the 'ORDERS' table which had a Customer ID value of 2 may be assigned one of three salt values, 1, 2 and 3, as a result of determining a salt factor of 3 for those rows. These salt values are assigned uniformly in that an equal proportion of the rows receive each of the salt values, which maximally reduces the size of the groups of rows having the same value of Customer ID and salt value, which would be processed in the same job on an executor. The salt values are assigned by writing them to a new column of the table, yielding modified table 410. Then, at step 250, the rows of the 'CUSTOMERS' table which have a Customer ID value of 2 are expanded into multiple rows, assigning to each one of the salt values. In this example, this means that the single row of Table 2 corresponding to a Customer ID of 2 is expanded into 3 rows, one with each of the salt values 1, 2 and 3. Advantageously, this modification only requires the expansion of the row corresponding to the Customer ID of 2, and not the expansion of any other rows. This yields a modified CUSTOMERS table 410.

Finally, at step 260, a join operation is performed on the modified first and second tables, wherein the rows of the first and second tables having the same combination of values in the first and second set of columns and the same salt value are joined on the same computational node.

In particular, the join operation performed on the modified tables may consist in joining the modified first and second tables such that a row in the second table is to be joined to a row in the first table if the first and second sets of columns match and the salt values match. The join operation performed on the modified tables may be the same join operation as obtained at step 210 (e.g. INNER JOIN, LEFT JOIN, RIGHT JOIN, OUTER JOIN).

Because joining the modified tables in this manner is formally equivalent to joining the original tables as specified at step 210, the result of the join may be directly used to provide a result to the original join query. In particular, any residual salt values in the joined table may be removed (e.g. by dropping columns containing the salt values, if these were written to columns), to provide the result to the original join query. Nevertheless, joining the modified tables may make more efficient use of the computational resources of the distributed data processing system, than joining the original tables.

In particular, the join operation may be performed by a distributed data processing system which is capable of performing the join in parallel over a plurality of computational nodes using a divide-and-conquer strategy such as a sort-merge strategy, as explained above with reference to system 100 of FIG. 1. Such a divide-and-conquer strategy, which may require that all the rows of the first table having a same value of the join key are processed on a single executor, may therefore greatly benefit from the reduction in the amount of data which needs to be processed together on a single executor. The present innovations, which enable a salt factor to be optimally determined for each value of join key, may make the best use of the computational resources of the distributed data processing system.

Finally, the join operation having been performed by the distributed data processing system, the resulting table may be provided to a user for visualisation, for example on a user computing device 160, and/or may be provided for consumption by an application on a computing device capable of communicating with the distributed data processing system.

FIG. 4 illustrates this join operation on the modified tables 410 and 420. In particular, joining the rows of the modified ORDERS table 410 with the rows of the modified CUSTOMERS table 420 having the same value of Customer ID and the same salt value may be performed in three distinct jobs, which may in particular be performed in parallel by multiple executors 440-460. In this manner, optimal use may be made of the computational resources of the executors by ensuring that the resources of the executors are not exceeded, and by enabling parallel computation.

Computing Device

Figure 5:
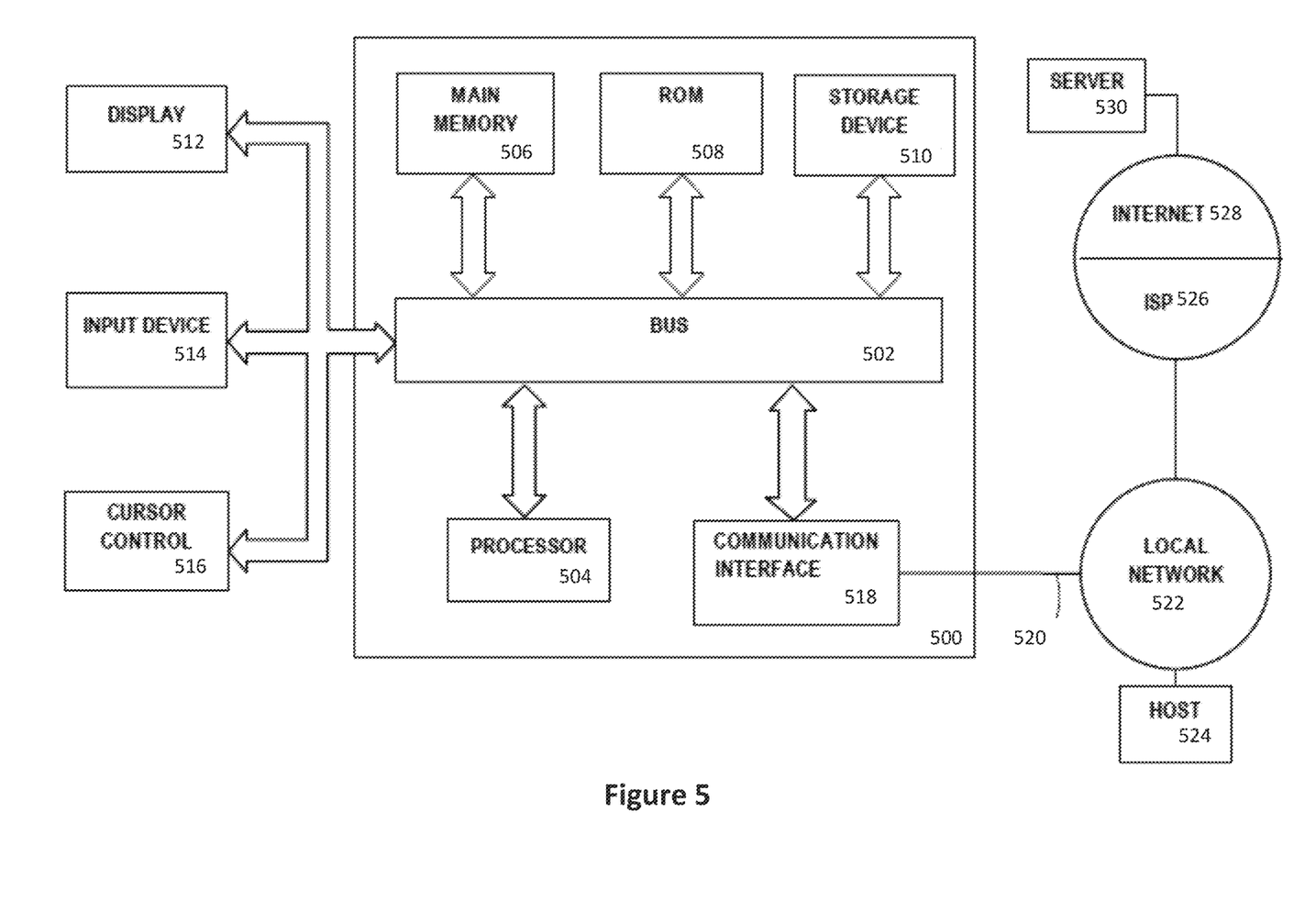
FIG. 5 shows an example computer device.

Referring now to FIG. 7, it is a block diagram that illustrates a computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described basic computer hardware is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Moreover, the techniques described above may be applied multiple times for compounding benefits. For example, where a database join involves two tables which are both large and/or suffer from data skew, the above automatic salting technique may be applied twice in succession to decompose both tables before performing the join on the executors.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

What is claimed is:

1. A computer-implemented method for performing a database join in a distributed data processing system comprising multiple computational nodes, the method comprising:
    obtaining data identifying a first database table and a second database table on which to perform a join operation;
    identifying a first set of one or more columns of the first table and a second set of one or more columns of the second table, based on which the join is to be performed;
    computing a salt factor based at least in part on a processing capacity of a computational node of the distributed data processing system;
    based at least in part on the computed salt factor and values in the first set of columns, assigning salt values to rows of the first table to create a modified first table;
    based at least in part on values in the second set of columns, expanding rows of the second table and assigning salt values the rows of the second table to create a modified second table; and
    performing a join operation on the modified first and second tables, wherein the rows of the modified first and second tables having the same values in the first and second sets of columns and the same salt value are joined on the same computational node, and wherein performing the join operation on the modified first and second tables comprises performing a join operation on the modified first and second tables such that a row in the second table is to be joined to a row in the first table if the values in the first and second sets of columns match and the salt values match.

2. A method according to claim 1, further comprising:
    estimating a size of the rows of the first table which have a particular combination of values in the first set of columns,
    wherein the salt factor is computed further based at least in part on the estimated size of the rows.

3. A method according to claim 2, wherein computing the salt factor based on the estimated size of the rows and further based on the processing capacity of the computational node of the distributed data processing system comprises computing the salt factor such that the estimated size of the rows divided by the salt factor is less than the processing capacity of the computational node of the distributed data processing system.

4. A method according to claim 2, wherein the estimated size of the rows of the first table which have a particular combination of values in the first set of columns is a total memory size of those rows.

5. A method according to claim 4, wherein estimating a total memory size of the set of rows of the first table having a particular combination of values in the first set of columns includes summing the estimated size of the rows of the first table having the particular combination of values in the first set of columns.

6. A method according to claim 1, wherein performing the join operation on the modified first and second tables comprises performing a distributed join operation on the first and second tables, wherein the distributed join operation is parallelized over multiple computational nodes.

7. A method according to claim 1, wherein performing the join operation on the modified first table and the modified second table comprises:
  decomposing the modified first table into a plurality of groups of rows, wherein for any combination of values of the first set of columns, all the rows of the modified first table having the combination of values in the first set of columns are in the same group of rows;
  decomposing the modified second table into one or more groups of rows, wherein for any combination of values of the second set of columns, all the rows of the modified first table having the combination of values in the second set of columns are in the same group of rows; and
  joining each group of rows of the modified first table with a group of rows of the modified second table having the same one or more combinations of values in the first and second sets of columns on a respective computational node.

8. A method according to claim 2, further comprising, prior to assigning salt values to rows of the first table:
  estimating a second estimated size of the rows of the first table having a second particular combination of values in the first set of columns;
  determining whether the second estimated size is less than a processing capacity of a computational node of the distributed data processing system; and
  in response to determining that the second estimated size is determined to be less than a processing capacity of a computational node of the distributed data processing system, refraining from assigning different salt values to rows of the set of rows of the first table having the second particular combination of values in the first set of columns, and refraining from expanding any row of the second table having the second particular combination of values in the second set of columns.

9. A method according to claim 8, comprising, prior to performing the join operation:
  estimating a third estimated size of the rows of the first table having a third particular combination of values in the first set of columns;
  computing a third salt factor m based on the third estimated size and further based on a processing capacity of a computational node of the distributed data processing system, wherein m is different from the salt factor;
  assigning one of m different salt values to each row of the set of rows of the first table having the third particular combination of values in the first set of columns; and
  for each row of the second table having the third particular combination of values in the second set of columns:
    expanding the row into m rows; and
    assigning a different one of the m salt values to each expanded row.

10. A method according to claim 1, wherein the processing capacity is an amount of available memory on a computational node of the distributed data processing system.

11. A method according to claim 10, further comprising, prior to computing the salt factor, measuring a current amount of available memory on a computational node of the distributed data processing system as the amount of available memory.

12. A data processing system configured to perform the method of claim 1.

13. One or more storage mediums comprising a computer program comprising instructions which, when executed by one or more computing apparatuses, cause the one or more computing apparatuses to carry out the method of claim 1.

* * * * *